J. Raney,
Water Wheel,
No. 72,680. Patented Dec. 24, 1867.

Witnesses.

Inventor:
James Raney
per
Alexander Mason
Atty.

United States Patent Office.

JAMES RANEY, OF NEW CASTLE, PENNSYLVANIA.

Letters Patent No. 72,680, dated December 24, 1867.

IMPROVEMENT IN WATER-WHEELS.

*The Schedule referred to in these Letters Patent and making part of the same.*

TO ALL WHOM IT MAY CONCERN:

Be it known that I, JAMES RANEY, of New Castle, in the county of Lawrence, and in the State of Pennsylvania, have invented certain new and useful Improvements in Casings for Water-Wheels, and Water-Wheels; and do hereby declare that the following is a full, clear, and exact description thereof, reference being had to the accompanying drawings, and to the letters of reference marked thereon.

Figure 1:
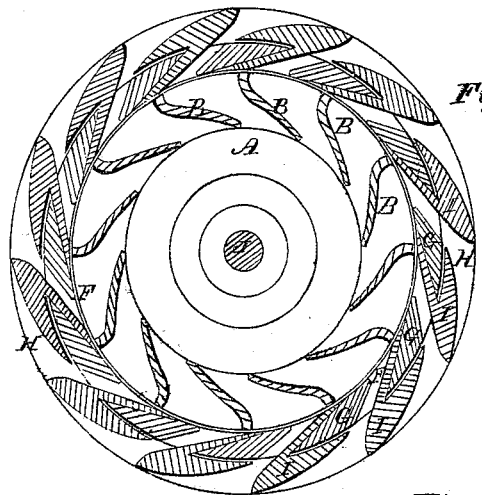
Figure 2:
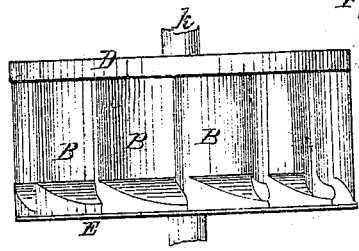
Figure 5:
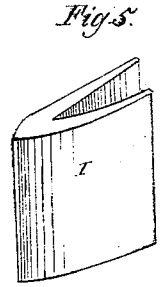
Figure 4:
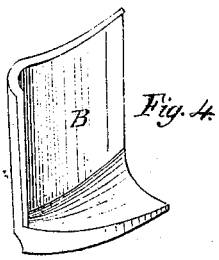
Figure 3:
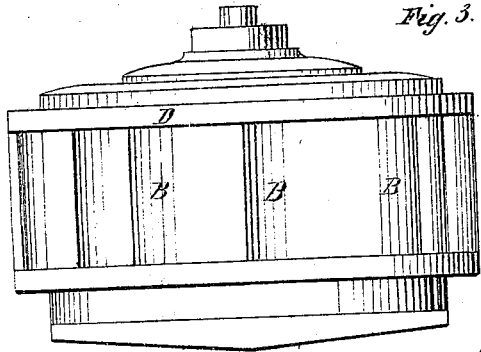

In the annexed drawings, making part of this specification, A represents a water-wheel, which lies in a horizontal manner, and which is composed of a series of buckets, B B, which are first made, and then confined to the under side of the top plate D, at their upper edges, while their lower edges are confined together by means of a rim, E. The buckets are made in the shape represented in Figure 4, having bottoms which taper in width as well as in thickness. In passing from the bucket, the water passes down an inclined plane, which is formed by the shape of the bottom. This wheel is surrounded by a stationary case, F, which is provided with a series of wings or partitions, G, between its upper and lower rims, which are placed equidistant apart, and one for each bucket of the wheel. It will be seen that the buckets are only connected to the hub of the wheel at their upper ends, and are so arranged, with reference to the hub, that an additional discharge of water is attained from the inner sides thereof, thereby greatly increasing the power of the wheel. This case, F, is surrounded with another case, H, which is also provided with a series of divisions or partitions, I. The partitions I are hollow, and open on one edge, so that the wings or partitions G G of wheel F can enter them, as is represented in fig. 1.

The water passes to the buckets of the water-wheel between the partitions I I and G G, and its supply is either cut off, or increased or diminished, by means of the movable or revolving outer case H. When this outer case is partially revolved in one direction, the partitions G draw out of partitions I, and close the openings or water-passages between them; but, when it is moved in the other direction, the reverse is the case, and water is admitted to the wheel.

A shaft, K, passes vertically through the centre of the wheel, and is securely confined to it. This shaft is provided with suitable bearings for both its upper and lower ends.

Having thus fully described my invention, what I claim as new, and desire to secure by Letters Patent, is—

The buckets B B, slightly curved, and having bottoms which taper in width and thickness, as shown and described, when connected between the plate and circular metallic rim E, all constructed and used as and for the purposes specified.

In testimony that I claim the foregoing, I have hereunto set my hand, this 5th day of October, 1867.

JAS. RANEY.

Witnesses:
C. M. ALEXANDER,
J. M. MASON.